Patented Mar. 20, 1923.

1,448,927

UNITED STATES PATENT OFFICE.

ROYER LUCKENBACH, OF BROOKLYN, NEW YORK, ASSIGNOR TO LUCKENBACH PROCESSES CO. (INC.), OF SAN FRANCISCO, CALIFORNIA, A CORPORATION OF NEVADA.

ADHESIVE COATING FOR ORE-RECEIVING SURFACES.

No Drawing.   Application filed August 16, 1917.   Serial No. 186,644.

*To all whom it may concern:*

Be it known that I, ROYER LUCKENBACH, a citizen of the United States, and a resident of the borough of Brooklyn, county of Kings, city and State of New York, have invented certain new and useful Adhesive Coatings for Ore-Receiving Surfaces, of which the following is a specification.

My invention relates to the vanner method of ore concentration in which ore in a finely divided state mixed with water to form a pulp is fed to a moving belt or other surface which is of such a character that the metallic particles will adhere thereto while the gangue will not.

There are as far as I am aware two systems of vanner separation, one in which the pulp is fed to a rubber belt which travels horizontally over pulleys. When the belt reaches the pulley toward which its upper side is travelling and changes its direction of movement from the horizontal to the vertical the gangue and water of the pulp will fall off by gravity. The metal content of the pulp has a slight affinity for the rubber of the belt and will adhere thereto for a short period of time even when it is on the under side of the belt. The metal will release itself from the belt about the time it reaches the lower face of the pulley and is therefore separated from the gangue.

The objection to the rubber belt vanner is that the metal particles have such a slight affinity for the rubber that a considerable proportion of them is scraped and washed off by the gangue and water and is lost.

The second process is used with the same apparatus but the working surface of the belt is coated with a thin film of oil for which the metal has a strong affinity. When the gangue and water fall off the belt the metal (sulphide) will adhere to the oil and is scraped therefrom with the oil coating by means of a scraper over which the belt travels. The belt is then re-oiled and the operation is continued.

This system is faulty for the reason that a certain proportion of the gangue will also adhere to the oiled surface and be scraped off with the metal so that it is impossible to obtain a clean concentrate.

The object of my invention is to provide a process of concentration of ores whereby the valuable mineral content of the ore is separated from the valueless earthy or rocky gangue, by the employment of a material having a strong preferential affinity for minerals in the free or virgin state, as well as certain chemical combinations thereof.

The invention may be carried out with all minerals and their chemical compounds which are subject to concentration by the oil flotation process at present in use, as well as with other mineral substances which will not be acted on by the materials employed in the oil flotation processes.

A further object is to provide a compound which will not only attract a certain class of materials but will retain them against dislodgment by centrifugal force or by agitation.

A further object is to provide a waterproof composition which will protect the belt or cylinder on which it is placed and will prevent the particles adhering thereto from being washed off.

These and further objects will more fully appear in the following specification and claim:

In carrying out my invention I provide a composition composed of an oil or grease and a resin, such as caoutchouc, mastic, shellac, congo, etc.

Preferably I employ a compound composed of petroleum grease and liquid rubber.

The liquid rubber may be made by dissolving Pará rubber in a solvent. I prefer, to make the liquid rubber by dissolving ½ oz. of rubber in 1 gal. of the solvent.

I have found a substance known as near-turpentine as admirably adapted as a rubber solvent. This material I am informed and believe is a petroleum distillate from which the fat or grease content has been removed. It is a clear, limpid liquid having the appearance of gasoline, benzine, or naphtha, and the odor of kerosene. I prefer to employ this substance because of its cheapness, but any other hydrocarbon solvent of rubber may be employed.

Without being understood as limiting myself thereby I prefer to use the ingredients in the following proportions: petroleum grease 1 part, liquid rubber 1 part.

The resultant composition is a thick, viscous, syrup-like liquid. The rubber imparts to the oil an added quality of cohesion, and of resistance to water, thus preventing the oil from dissipating.

The composition is applied to the belt or other surface of a vanner machine in the form of an extremely thin coating. Immediately the pulp strikes the belt the selective qualities of the coating separate and retain the mineral content while the earthy particles pass over with the water leaving the mineral values adhering to the coating. When in its travel the coated surface of the belt, when employed, reaches a position other than the horizontal with the coated side up, the water and the gangue will be discharged by gravity. The concentrates will adhere to the coated surface even when said surface is on the under-side of the belt. As the belt continues its travel the coating is scraped or otherwise removed from the supporting surface and the concentrates removed therefrom mechanically or by a suitable solvent. I prefer to remove the concentrates from the composition in a press so that the compound may be recovered. A new coating is then applied to the surface and the operation is repeated.

The water-proofing quality which the rubber imparts to the oil or grease prevents the latter from being washed or scoured from the surface of the belt and thereby effects a great saving of the oil.

The proportion of grease and rubber may vary considerably as depends upon the quality or kind of ore operated upon and for various other reasons.

The process is carried out in connection with a pulp formed of ore, and water at the normal temperature of the mine or mill water. The temperature of the water has no effect on the coating.

In accordance with the provisions of the patent statutes, I have described the principle of my invention together with what I now consider the best embodiment thereof, but I desire to have it understood that the embodiment described is merely illustrative and the invention may be carried out in other ways.

Having now described my invention what I claim and desire to secure by Letters Patent of the United States is as follows:—

An adhesive coating for ore receiving surfaces consisting of petroleum grease and liquefied rubber, whereby the mineral values in the pulp will adhere to the coating and the gangue will not.

This specification signed and witnessed this 13th day of August, 1917.

ROYER LUCKENBACH.

Witnesses:
JAS. F. COLEMAN,
THOS. S. BERGIN.